United States Patent

[11] 3,535,971

[72] Inventor Katsuhiko Hirano
Hamakita-shi, Japan

[21] Appl. No. 721,826
[22] Filed April 16, 1968
[45] Patented Oct. 27, 1970
[73] Assignee Nippon Gakki Seizo Kabushiki Kaisha
Hamamatsu-shi, Japan
[32] Priority June 19, 1967
[33] Japan
[31] No. 42/38,850

[54] SWITCHING CIRCUIT FOR ELECTRONIC MUSICAL INSTRUMENTS
10 Claims, 15 Drawing Figs.

[52] U.S. Cl. .......... 84/1.26, 307/254
[51] Int. Cl. .......... G10h 1/02
[50] Field of Search .......... 84/1.13, 1.26; 307/254

[56] References Cited

UNITED STATES PATENTS

| | | | |
|---|---|---|---|
| 3,005,114 | 10/1961 | Martin et al. | 307/254X |
| 3,230,397 | 1/1966 | Linder | 307/237 |
| 3,389,211 | 6/1968 | Slaats | 84/1.13X |

*Primary Examiner*—Herman Karl Saalbach
*Assistant Examiner*—Tim Vezeau
*Attorney*—Holman and Stern

ABSTRACT: A collector-grounded type amplifier is used in a front stage of a switching circuit and connected directly to a tone generator, and an emitter-grounded type amplifier is used in a rear stage of the circuit to produce a high output impedance. In modifications of the circuit, transistors or diodes are inserted between the input terminal and the front stage and between the front and rear stages.

INVENTOR.
K. HIRANO
BY Glascock, Downing & Seebold
ATTORNEYS

SWITCHING CIRCUIT FOR ELECTRONIC MUSICAL INSTRUMENTS

BACKGROUND OF THE INVENTION

This invention relates generally to the field of electronic musical instruments and more particularly to improvements in switching circuits of electronic musical instruments. More specifically, the invention concerns a new and improved switching circuit having a sufficiently large signal switching ratio (as defined hereinafter) and, moreover, is suitable for construction in the form of an integrated circuit.

In electronic musical instruments, in general, switching circuits are used in many instances to switch signals by controlling the rise and the decay of sound signals in order to prevent click noises and apply a sustaining effect.

A representative example of switching circuits used heretofore is illustrated in FIG. 1 of the accompanying drawings (described hereinafter). This circuit is provided with a ground (earth) terminal 1, a power supply terminal 2, an input terminal 3, an output terminal 4, and a control terminal 5. A signal introduced through the input terminal 3 is divided by resistors $R_1$, $R_2$, and $R_3$ is applied to the base of a transistor T, and, passing from the collector having a load resistor $R_4$ through a capacitor C, is led out through the output terminal 4.

An envelope-forming circuit 6 containing a key switch K is connected to the control terminal 5 to accomplish on-off control of the emitter of the transistor T by way of a resistor $R_5$. A multivibrator is used in many instances as a tone generator, in which case a square-wave signal vibrating substantially the full amplitude between the power source and the ground as indicated in FIG. *2a* is continually applied to the input terminal 3. Since the collector current of the transistor flows with a magnitude proportional to the magnitude of the base potential on the conducting side relative to the emitter potential, a square-wave signal having an amplitude dependent on an envelope signal supplied at the control terminal 5 by the on-off operation of the key switch appears at the output terminal 4.

In a switching circuit of such organization and operation, a reverse bias is applied between the base and emitter of the transistor T when the key switch K is "OFF", and the transistor is in a cut-off state. However, because of the barrier capacitance between the base and the collector, the input signal of the form indicated in FIG. *2a* becomes a leakage signal of a differentiated waveform as indicated in FIG. *2b* and appears at the output terminal 4. Since this leakage signal becomes additive with the number of switching circuits and becomes noise during pauses in rendition, this is an undesirable feature in practice for musical instruments.

Furthermore, in recent planar type transistors, the breakdown voltage between the base and emitter in each case is of a low value of from 6 to 7 volts, and, therefore, it is necessary to divide the input signal voltage so that its amplitude becomes less than this value.

SUMMARY OF THE INVENTION

It is an object of the present invention to provide a switching circuit in which the output of a tone generator is used directly as the input, and, by reducing the effect of the barrier capacitance of transistors in comparison to that of known switching circuits, the leakage signal is reduced, and the signal switching ratio is made amply large.

Another object of the invention is to provide a switching circuit in which, by using a collector-grounded type amplifier in the front or first stage of the circuit thereby to make possible the use of an extremely high input impedance, this amplifier can be connected directly to a tone generator without imparting any deleterious effect to the tone generator.

Still another object of the invention is to provide a switching circuit in which, by using at least two transistors in series connection, the input breakdown voltage is caused to become approximately 12 to 14 volts, and the front-stage transistor can thereby be connected directly to a tone generator without the necessity of a voltage-dividing element.

A further object of the invention is to provide a switching circuit in which an emitter-grounded type amplifier in the rear or last stage of the circuit allows the output impedance to be high, whereby the outputs of a plurality of switching circuits can be directly mixed at their collectors and led out through the use of only a single load resistor.

An additional object of the invention is to provide a switching circuit composed principally of transistors and/or diodes in direct connection, and the number of resistors is small, whereby the circuit is highly adaptable to construction thereof in the form of an integrated circuit, and, accordingly, circuits with very small deviations in characteristics can be produced.

According to the present invention, briefly summarized there is provided a switching circuit for electronic musical instruments including an envelope-forming circuit having a key switch. This switching circuit is characterised by the combination of a front stage, comprising a collector-grounded type amplifier having a first emitter, and a rear stage comprising an emitter-grounded type amplifier having a second emitter and a base. The first emitter is connected to said base directly or through only at least one semiconductor element without a coupling capacitor and a bias resistor. The envelope-forming circuit is connected commonly to the first and second emitters through respective resistors thereby to control the same simultaneously.

The nature, principle, details, and utility of the invention will be more clearly apparent from the following detailed description with respect to preferred embodiments of the invention when read in conjunction with the accompanying drawings, in which like parts are designated by like reference numerals and characters.

Figure 1:
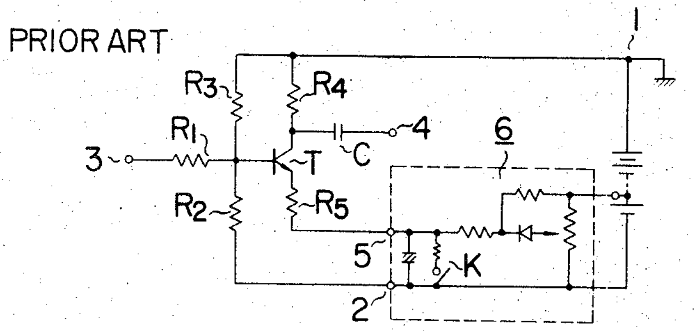
FIG. 1 is a circuit diagram of a representative example of a known switching circuit for electronic musical instruments.
Figure 2A:
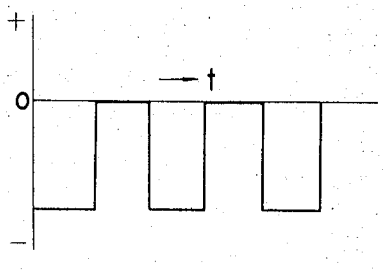
Figure 2B:
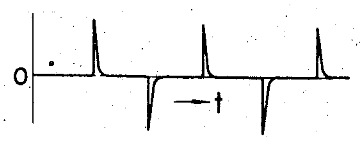
Figure 3:
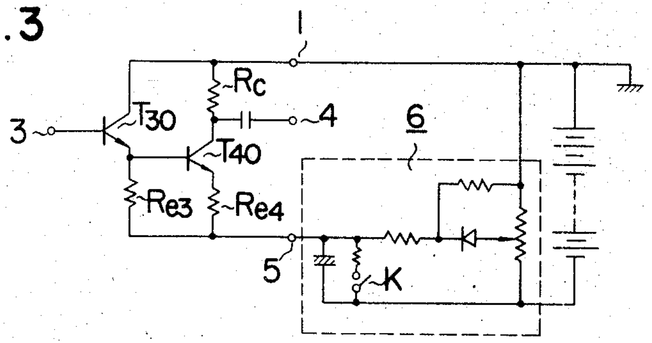
Figure 4:
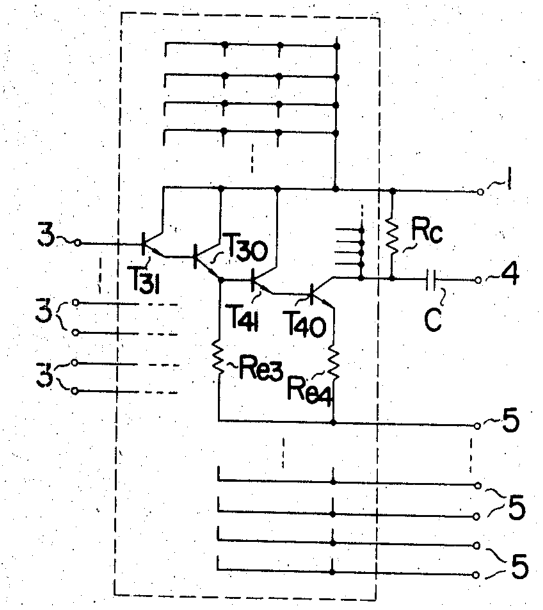

FIG. *2a* is a waveform diagram indicating an output tone signal of a tone generator;

FIG. *2b* is a waveform diagram indicating a leakage signal at the output terminal of the circuit of FIG. 1 in a cut-off state;

FIG. 3 is a circuit diagram indicating a basic construction of the switching circuit according to the invention;

FIG. 4 is a circuit diagram showing one example of practical embodiment of the invention; and FIG. *5a* through *5j* are circuit diagrams respectively showing other examples of several embodiments of the invention.

DETAILED DESCRIPTION

The switching circuit of the invention in its basic form, as illustrated in FIG. 3, comprises a front stage composed of a collector-grounded type amplifier including a transistor $T_{30}$ and a rear stage composed of an emitter-grounded type amplifier including a transistor $T_{40}$ having a base connected directly (in the sense that the connection is not of the type wherein they are coupled by a capacitor, and bias resistors are newly provided) to the emitter of the transistor $T_{30}$ and having a resistor $R_c$ as a load resistor.

The emitters of the transistors $T_{30}$ and $T_{40}$ are connected commonly to a control terminal 5 through resistors $Re_3$ and $Re_4$, respectively, and are gang controlled by an envelope signal from an envelope-forming circuit 6 including a key switch K. The circuit is provided with an input terminal 3 connected directly to the base of the transistor $T_{30}$ and with an output terminal 4. Since the envelope-forming circuit 6 including the key switch K can be of any suitable known type, detailed description thereof will be omitted, and the following description will be directed particularly to the switching circuit part characteristic of the invention with respect to a number of preferred embodiments thereof.

One of these examples of the switching circuit according to the invention is shown in FIG. 4, in which the relationship of the circuit to a plurality of other circuits of identical type is also indicated in abbreviated form. The input terminal 3 of each switching circuit is connected directly to the base of a collector-grounded transistor $T_{31}$, the emitter of which is connected directly to the base of a succeeding collector-grounded transistor $T_{30}$, and the emitter of the transistor $T_{30}$ is connected directly to the base of a succeeding collector-grounded transistor $T_{41}$ and, at the same time, connected by way of a resistor $Re_3$ to a control terminal 5. The emitter of the transistor $T_{41}$ is connected directly to the base of a transistor $T_{40}$ of a succeeding emitter-grounded type amplifier, and emitter of the transistor $T_{40}$ is connected through a resistor $Re_4$ to the control terminal 5. The collector of the transistor $T_{40}$ is grounded through a load resistance $R_c$ and, at the same time, is connected through a capacitor C to an output terminal 4.

This circuit illustrated in FIG. 4 is equivalent to a circuit as shown in FIG. 3 in which, between the input terminal 3 and the transistor $T_{30}$ and between the transistor $T_{30}$ and the transistor $T_{40}$, transistors $T_{31}$ and $T_{41}$ each with a grounded collector and a base functioning as an input side and an emitter functioning as the output side are respectively inserted in direct connection. By thus adding up the base-emitter breakdown voltages of the two transistors 30 and 31 in each of the preceding two stages, the allowable input signal is increased. At the same time, by arranging the base-emitter barrier capacitances in a multistage series connection and, moreover, shunting the signal with respect to the grounded side by means of the base-collector barrier capacitance for each stage, the quantity of the leakage signal finally appearing at the output terminal 4 is reduced when the circuit is in the cut-off state.

Great convenience is afforded when the parts of the above described circuit within the intermittent-line enclosure in FIG. 4 (including resistance Rc in some cases) are constructed in the form of an integrated circuit. In this case, the collectors of the transistors $T_{31}$, $T_{30}$, and $T_{41}$ are all commonly connected throughout all switching circuits in one group of a plurality of switching circuits which are to be combined, and only the collectors of the transistors $T_{40}$ of all switching circuits are commonly connected to each other. An input terminal 3 and a control terminal 5 is provided for each switching circuit.

The circuit illustrated in FIG. 4 will now be considered with respect to the case wherein a tone generator having an output of a square waveform and an amplitude corresponding substantially to the full power supply voltage is connected directly to the input terminal 3, and a potential $(-E_5)$ from the envelope-forming circuit 6 as shown in FIG. 3 is applied to the control terminal 5.

In this case, the collector current of the transistor $T_{40}$ becomes a square-waveform current reciprocating between zero and approximately $(E_5 - 4v_{BE})/Re4$, and the output amplitude is controlled in accordance with the potential applied to the control terminal 5. Here, $V_{BE}$is the voltage drop in the forward direction across the base and emitter of each transistor and is assumed to be equal for all transistors. A voltage $(E_5 - 4V_{BE})RC/Re_4$ appears as an output voltage at the load resistor Rc.

The possible range of the collector potential of the transistor $T_{40}$ in this case (which range restricts the combined output voltage) is from zero (ground potential) to $-(4V_{BE} - V_{CES})$, where $V_{CES}$ denotes the saturated voltage between the collector and emitter of the transistor $T_{40}$. Accordingly, the value of the load resistance Rc is so selected that the collector potential falls within this range even when a current equal to n (the number of the plurality of circuits in the one group) times the above mentioned collector current flows through the resistance Rc. For the transistors, silicon transistors are suitable since they possess high values of voltage drop $V_{BE}$ and are suited for incorporation in integrated circuits.

As a result of actual measurements relating to switching ratios, I have found that, with a square-waveform input of 10 $V_{p-p}$ at 1.5 kHz, the switching ratio in a known circuit as shown in FIG. 1 was 55 dB, while that of a circuit of the invention as illustrated in FIG. 4 was approximately 85 dB, indicating an improvement of approximately 30 dB. The term "-switching ratio" as used herein is the comparative ratio of measured peak-to-peak values of the output square waveform of the circuit in conductive state and of the output differentiated waveform of the circuit in nonconductive or cut-off state.

In accordance with the principle and teachings of the present invention, a large number of switching circuit construction and modifications thereof are possible as indicated by the following examples of other preferred embodiments of the invention. Each of these examples will be described with respect to one circuit among the plurality of switching circuits connected in combination to constitute a group.

Figure 5A:
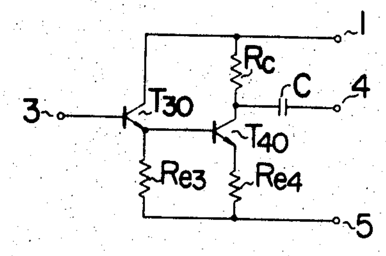
Figure 5B:
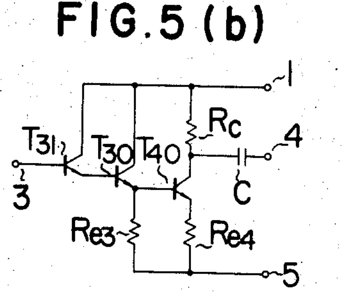
Figure 5C:
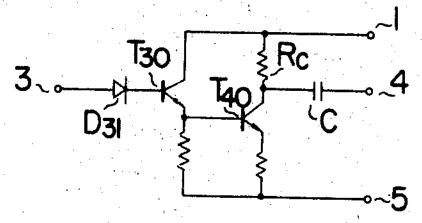

FIG. 5*a* illustrates an example of a circuit which can be used in the case where the input voltage is less than approximately 5 $V_{p-p}$, and which has a construction equivalent to that shown in FIG. 4 without the transistors $T_{31}$ and $T_{41}$, that is, the same construction as the basic circuit shown in FIG. 3. The circuits illustrated in FIGS. 5*b* and 5*c* respectively have a transistor $T_{31}$ and a forward-direction diode $D_{31}$ inserted in direct connection in front of their transistors $T_{30}$ and afford ample switching ratios up to an input voltage of approximately 10 $V_{p-p}$.

Figure 5D:
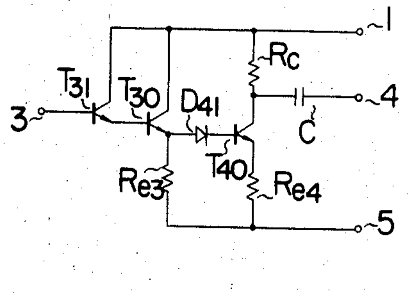
Figure 5:
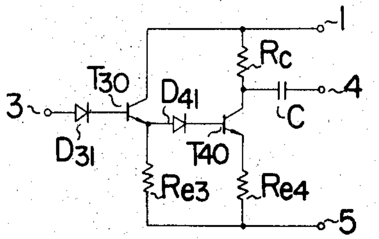
Figure 5:
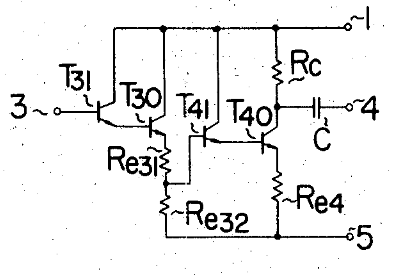
Figure 5:
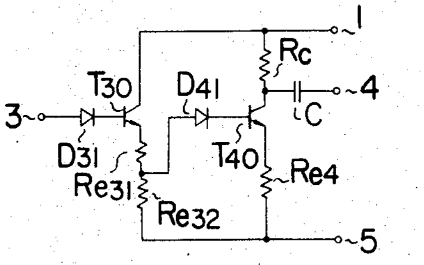
Figure 5:
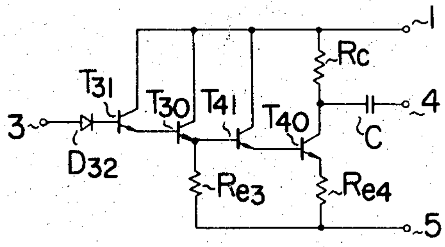
Figure 5:
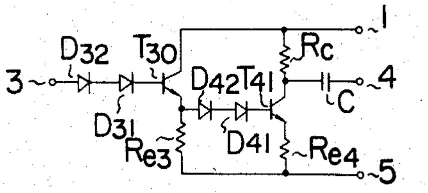
Figure 5:
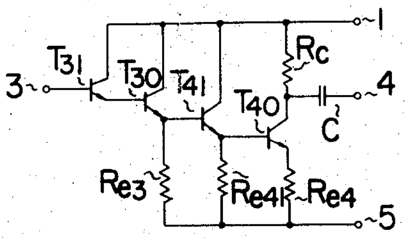

The circuit illustrated in FIG. 5*d* is equivalent to a circuit as shown in FIG. 4 in which the transistor $T_{41}$ has been replaced by a diode $D_{41}$, while FIG. 5*e* illustrates the circuit in the case wherein an input impedance is sufficient with the valve of $\beta$ $Re_3$, and the transistor $T_{31}$ also has been replaced by a diode $D_{31}$ $\beta$ stands for the current amplification factor of the grounded emitter transistor.

In the circuit illustrated in FIG. 5*f*. the resistor $Re_3$ is divided into two resistors $Re_{31}$ and $Re_{32}$, and the division junction therebetween is connected directly to the succeeding transistor $T_{41}$ for the purpose of determining the available range of the collector potential of the output stage and the signal level applied to the base of the transistor 41. FIG. 5*g* shows the same circuit after the transistors $T_{31}$ and $T_{41}$have been replaced by diodes $d_{31}$ and $d_{41}$.

The higher input signal voltage can be safely permitted by circuit arrangement as illustrated in FIGS. 5*h* and 5*i*. In the circuit shown in FIG. 5*h*, a diode $D_{32}$ has been further added on the input side of the circuit of FIG. 4, whereby the switching ratio is increased by approximately 6 dB above that of the circuit of FIG. 4, and the circuit is capable of withstanding a higher input voltage. In the circuit shown in FIG. 5*i*, diode $D_{31}$ and diodes $D_{42}$ and $D_{41}$ are respectively used in place of transistors $T_{31}$ and $T_{41}$ in the circuit of FIG. 5*h*. In either case, the larger number of transistors or diodes in the various direct-connection parts of the circuit are inserted, the higher input signal voltage can be safely permitted, the higher the switching ratio becomes and, moreover, the wider becomes the available range of the above mentioned collector potential of the output stage, whereby the higher combined output signal voltage can be obtained.

In a further embodiment of the invention as illustrated in FIG. 5*j*, the emitter of transistor $T_{41}$ is also connected to the control terminal 5 through a resistor $Re_{41}$ to accomplish simultaneous switching control of transistors of three stages. In this case, the leakage signal during cut-off stage is substantially reduced.

The principal advantageous features of the switching circuit of the above described organization and operation according to the invention are as summarized 1. Since the barrier capacitance effect is reduced in comparison with that of a conventional switching circuit, the leakage signal is reduced, and the switching ratio is increased.

2. Since the front stage is a collector-grounded type amplifier, an extremely high input impedance can be used, and, therefore, the circuit can be connected directly to a tone generator without any deleterious effect.

3. Since at least two transistors are connected in series, the input breakdown voltage becomes approximately from 12 to 14 volts, and, therefore, the circuit can be connected directly to a tone generator without the use of a voltage-dividing element. Accordingly, a resistance component for voltage division or for bias becomes unnecessary.

4. Since the rear stage is an emitter-grounded type amplifier, the output impedance is high (of the order of 100 kiloohms), and therefore, a plurality of circuits can be directly connected in combination at their collectors with a single load resistor and without otherwise necessary mixing resistors.

5. Since the circuit is composed principally of transistors and/or diodes in direct connection, and the number of resistors is small, the circuit can be readily constructed in the form of an integrated circuit. Accordingly, circuits with very small deviations in characteristics can be produced.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. A switching circuit for electronic musical instruments comprising: a first stage transistor amplifier of grounded collector configuration, said first stage having a first emitter and a first base, a last stage transistor amplifier of common emitter configuration, said last stage having a second emitter and a second base, said first emitter being connected to said second base, and an envelope forming circuit having a key switch and being connected commonly through respective resistors to the first and second emitters to control the first and last stages, whereby a large amplitude input signal applied to the first base of said first stage transistor amplifier is controllably propagated through said switching circuit in accordance with the condition of said key switch.

2. A switching circuit as claimed in claim 1 wherein said first emitter is connected directly to said second base.

3. The switching circuit as claimed in claim 2 which is produced in the form of an integrated circuit.

4. The switching circuit as claimed in claim 1 wherein said first emitter is connected to said second base only through semiconductor elements, whereby coupling capacitors and bias resistors are eliminated.

5. The switching circuit as claimed in claim 4 which has an input terminal on the input side of the first stage, and in which a transistor, having a grounded collector, a base functioning as an input side, and an emitter functioning as an output side, is inserted between said input terminal and the amplifier of the first stage 6. The switching circuit as claimed in claim 5 which is produced in the form of an integrated circuit.

7. The switching circuit as claimed in claim 1 which has an input terminal on the input side of the first stage, and in which at least one diode is inserted between said input terminal and the amplifier of the first stage, and at least one diode is inserted between the amplifiers of the first and last stages.

8. The switching circuit as claimed in claim 1 in which the resistor of the first emitter of the first stage is divided into two parts serially connected at a division junction, said switching circuit having an input terminal on the input side of the first stage, a third transistor having a grounded collector, a third base, and a third emitter, said third base being connected to said division junction, and said third emitter being connected to second base of said last stage, a fourth transistor having a grounded collector, a fourth base, and a fourth emitter, said fourth base being connected to said input terminal on the input side of the first stage, and said fourth emitter being connected to the first base of said first stage.

9. The switching circuit as claimed in claim 1 which has an input terminal on the input side of the first stage, and an output terminal on the output side of said last stage, said input terminal being connected to the first base of said first stage, said output terminal being connected to the collector of said last stage through a capicitor.

10. A switching circuit for an electronic musical instrument comprising: a first stage including a grounded collector type amplifier having a first emitter, a last stage including a common emitter type amplifier having a second emitter and a base, said first emitter being connected to said base only through semiconductor elements whereby coupling capacitors and bias resistors are eliminated, and an envelope forming circuit including a key switch and connected commonly to the first and second emitters thereby to control the same through respective resistors.